(12) United States Patent
Silberberg

(10) Patent No.: US 9,151,606 B2
(45) Date of Patent: Oct. 6, 2015

(54) POST LEVEL

(71) Applicant: Mark L. Silberberg, Fallbrook, CA (US)

(72) Inventor: Mark L. Silberberg, Fallbrook, CA (US)

(*) Notice: Subject to any disclaimer, the term of this patent is extended or adjusted under 35 U.S.C. 154(b) by 114 days.

(21) Appl. No.: 14/102,192

(22) Filed: Dec. 10, 2013

(65) Prior Publication Data
US 2015/0160008 A1 Jun. 11, 2015

(51) Int. Cl.
G01C 9/28 (2006.01)
G01C 9/34 (2006.01)

(52) U.S. Cl.
CPC ... *G01C 9/34* (2013.01); *G01C 9/28* (2013.01)

(58) Field of Classification Search
CPC .................................. G01C 9/28; G01C 9/34
USPC ............................................ 33/373, 381, 382
See application file for complete search history.

(56) References Cited

U.S. PATENT DOCUMENTS

| | | | |
|---|---|---|---|
| 715,946 A * | 12/1902 | Bennett ........................... 33/382 |
| 1,362,814 A * | 12/1920 | Neidl .............................. 33/381 |
| 2,635,350 A | 4/1953 | Bettega |
| 2,748,494 A | 6/1956 | Raney |
| 3,584,212 A | 6/1971 | Hansen |
| 3,740,858 A * | 6/1973 | Ostrager ......................... 33/369 |
| 4,473,957 A * | 10/1984 | Faulkner ........................ 33/666 |
| 4,593,475 A | 6/1986 | Mayes |
| D301,553 S | 6/1989 | Makofsky et al. |
| D332,226 S | 1/1993 | Hutchins et al. |
| 5,245,758 A * | 9/1993 | Riley .............................. 33/451 |
| D355,134 S | 2/1995 | Kennedy |
| D371,309 S | 7/1996 | Webb |
| D389,758 S | 1/1998 | Motamed |
| D395,013 S | 6/1998 | Webb |
| D409,100 S | 5/1999 | Brimer |
| D411,470 S | 6/1999 | Webb |
| 6,070,336 A * | 6/2000 | Rodgers ......................... 33/613 |
| D504,834 S | 5/2005 | DeBoer et al. |
| D538,186 S | 3/2007 | Silberberg |
| D539,679 S | 4/2007 | Silberberg |
| D590,280 S | 4/2009 | Allemand |
| D597,871 S | 8/2009 | Liao |
| D597,873 S | 8/2009 | Gofer |
| D613,194 S | 4/2010 | Silberberg |
| 7,802,372 B1 | 9/2010 | Silberberg |
| 7,946,045 B2 | 5/2011 | Allemand |
| D646,597 S | 10/2011 | Allemand |
| 8,061,051 B2 | 11/2011 | Allemand |
| 2003/0066198 A1* | 4/2003 | Turner ............................ 33/370 |
| 2011/0138642 A1* | 6/2011 | Norelli ........................... 33/371 |
| 2014/0283400 A1* | 9/2014 | Lamont et al. ................. 33/379 |
| 2015/0075017 A1* | 3/2015 | Christianson .................. 33/371 |

* cited by examiner

*Primary Examiner* — G. Bradley Bennett
(74) *Attorney, Agent, or Firm* — James E. Brunton

(57) ABSTRACT

A post level for determining the orientation of a structure that includes a pair of bubble vials that are secured within the level body in a manner such that, if either one of the bubble vials become broken or otherwise damaged, it can be easily replaced and the level need not be discarded. The body of the post level of the invention includes an upper portion, a lower portion having a first side having a slot, an intermediate portion and a rear surface having an outwardly extending locating shoulder for engaging the structure to be oriented. The post level also includes a bulls-eye level that is mounted on the intermediate portion of the level body and an elastomeric connector cord that is receivable within the slot of the first side of the body which enables the level to be removably secured to the structure being oriented. Additionally, the level includes a plurality of magnets that are connected to the level body for engagement with the structure to be oriented.

20 Claims, 8 Drawing Sheets

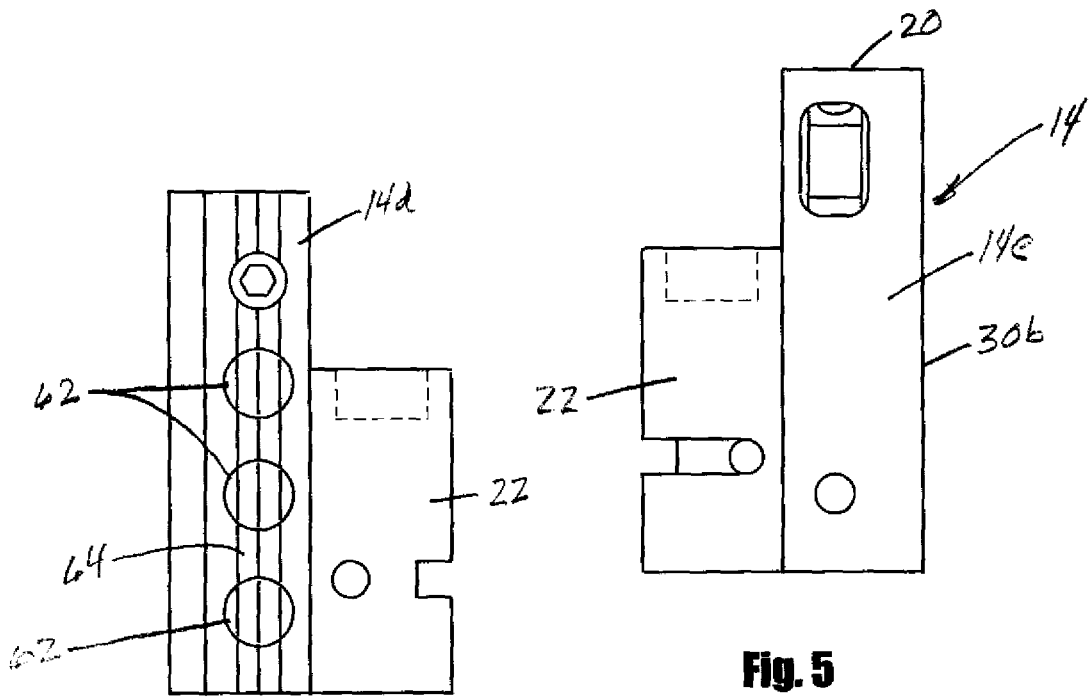
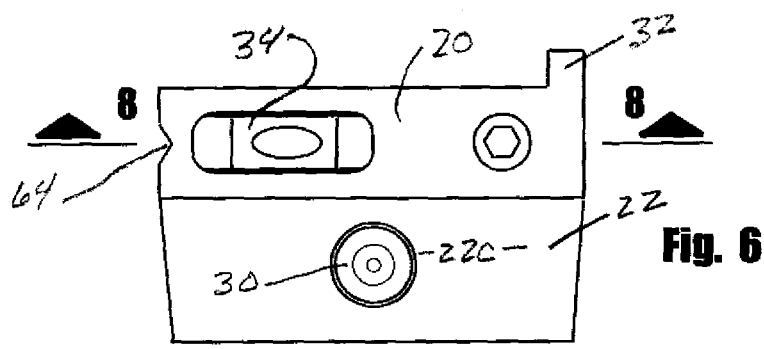
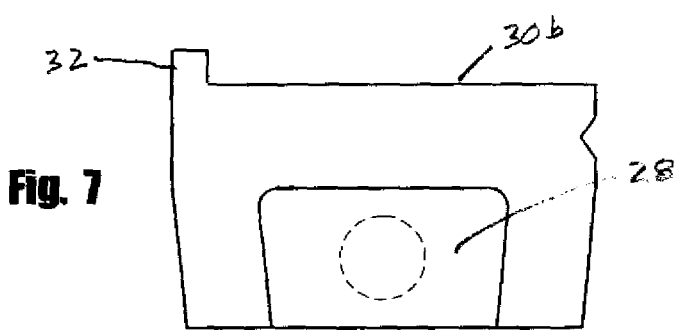

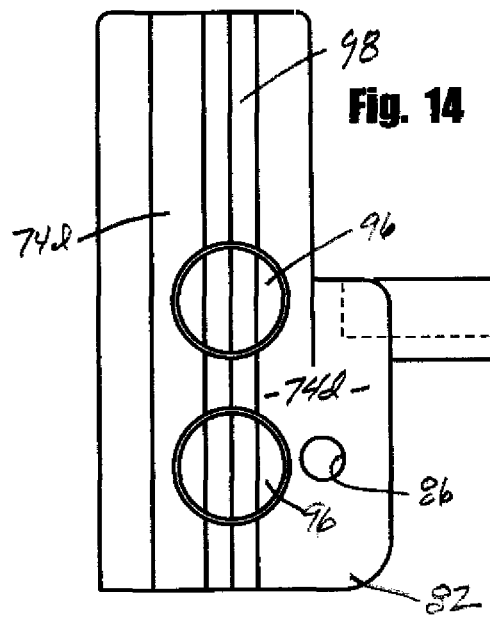
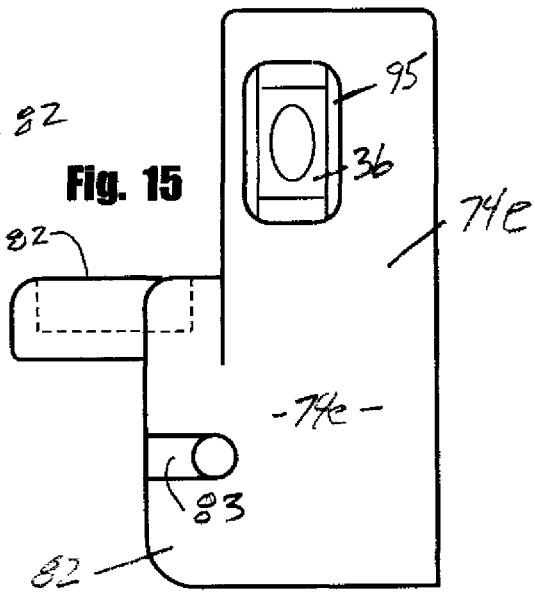
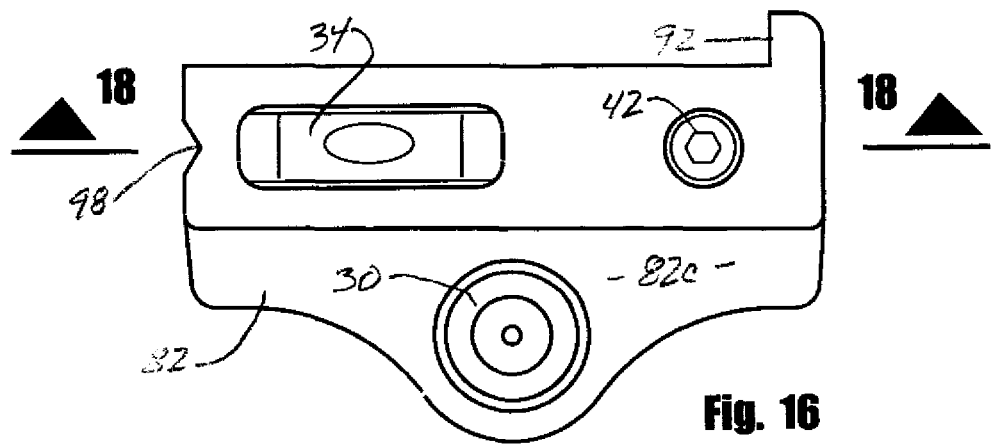
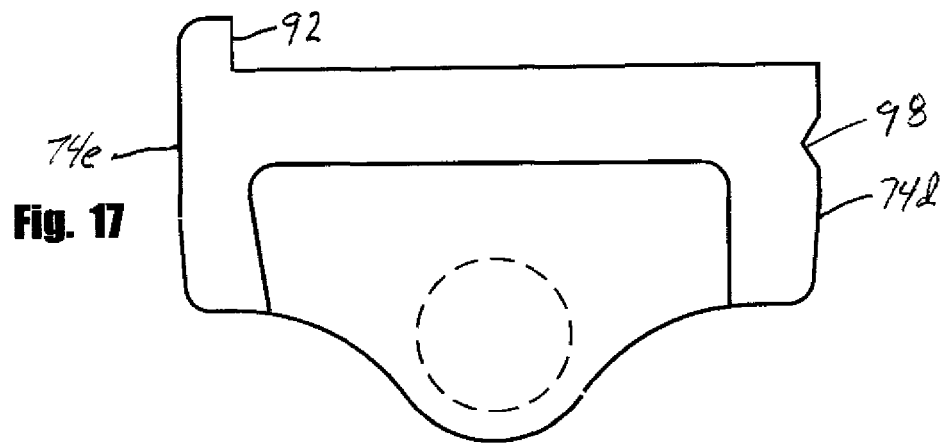

POST LEVEL

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to tools used in the construction industry. More particularly, the invention concerns a specially designed leveling tool for setting posts that has replaceable bubble vials and includes a strategically located bulls-eye level, magnets for removably affixing the tool to posts made of ferrous material and an elastomeric connector cord that is connected to the tool body and functions to expeditiously interconnect the tool with the post.

2. Description of Related Art Including Information Disclosed Under 37 CRF 1.97 and 1.98

Bubble levels of various designs have been suggested in the past and are widely used by construction workers to determine the orientation of a particular structure or surface with respect to a reference axis. A typical bubble level generally comprises an elongated body that has a pair of opposing, generally parallel working surfaces and includes a plurality of openings having bubble vials permanently secured therein. The bubble vials are typically aligned in different directions relative to the working surfaces and function to indicate the orientation of a structure. For example, one vial may be aligned in a direction perpendicular to the working surfaces, another may be aligned in a direction parallel to the working surfaces and a third may be aligned in an angular direction. Typically, the vial contains a fluid and a bubble, and the user views the position of the bubble within the vial to determine the position of the tool relative to the working surfaces.

A novel and highly useful level construction is disclosed in U.S. Pat. No. 7,802,372 issued to the present inventor. This patent, which is entitled "Removable Laser Base Attachment for Bubble Levels", describes a bubble level that includes a body, a laser beam generator, and a removable securement. The body has a flat top surface that the level is secured to and a bottom surface that is flat and parallel to the top surface. A laser diode mounted in a module emits a visible laser beam upon application of power from a battery that is controlled by a switch. The module, batteries, and switch are mounted in a through bore in the body. The laser base is removably secured to the bubble level by any manner appropriate to the shape of the level. In one such securement, the level has a T-shaped cross-section and the body has a complementary slot into which the level slides. When the level reference surface abuts the top surface of the laser base, a thumb screw is tightened to frictionally secure the level in the base.

BRIEF SUMMARY OF THE INVENTION

It is an object of the present invention to provide a specially designed leveling tool for use in accurately and expeditiously positioning posts and like work pieces. The tool includes a strategically located work piece engaging surface for engagement with the post being set. Additionally, the tool includes a pair of differently oriented bubble vials that are secured within the tool body in a manner such that, if either of the bubble vials become broken, or otherwise damaged, it can be easily replaced and the level need not be discarded.

Another object of the invention is to provide a tool of the character described in the preceding paragraph in which the bubble vials are securely held in position within threaded chambers formed in the level body by easily removable threaded cap screws.

Another object of the invention is to provide a tool of the aforementioned character in which the body of the leveling tool is provided with a plurality of viewing openings that permit the user to clearly view the pair of bubble vials from the top, from the front and from the sides of the tool.

Still another object of the invention is to provide a tool of the character described in the preceding paragraphs that includes a rear surface having an outwardly extending locating shoulder for engaging the structure to be oriented and precisely aligning the tool relative to the structure.

Another object of the invention is to provide a tool of the class described that is provided with a plurality of spaced apart magnets that function to permit the tool to be conveniently, removably connected to any ferrous structure that is being oriented.

Another object of the invention is to provide a tool of the character described which includes a bulls-eye level that is mounted on an intermediate surface of the tool body proximate the center thereof.

Another object of the invention is to provide a post setting tool that includes spaced apart slotted side portions that define a centrally disposed chamber.

Still another object of the invention is to provide a tool of the character described in the preceding paragraph that includes an elastomeric cord that includes a first end that is connected to the tool body, a second free end and an intermediate portion that is receivable within the slots of the slotted side portions in a manner to releasably interconnect the tool with the structure being oriented.

Yet another object of the invention is to provide a tool of the type described in which at least one of the surfaces of the tool includes a centrally disposed, generally V-shaped groove for longitudinally centering tubular shaped work pieces.

These and other objects of the invention will be realized by the level construction illustrated in the drawings and described in the paragraphs that follow.

BRIEF DESCRIPTION OF SEVERAL VIEWS OF THE DRAWINGS

FIG. 4 is a left side view of the tool shown in FIG. 1.

FIG. 5 is a right side view of the tool shown in FIG. 1.

FIG. 6 is a top plan view of the tool shown in FIG. 1.

FIG. 7 is a bottom plan view of the tool shown in FIG. 1.

FIG. 14 is a left side view of the tool shown in FIG. 12.

FIG. 15 is a right side view of the tool shown in FIG. 12.

FIG. 16 is a top plan view of the tool shown in FIG. 12.

FIG. 17 is a bottom plan view of the tool shown in FIG. 12.

DETAILED DESCRIPTION OF THE INVENTION

Figure 8:
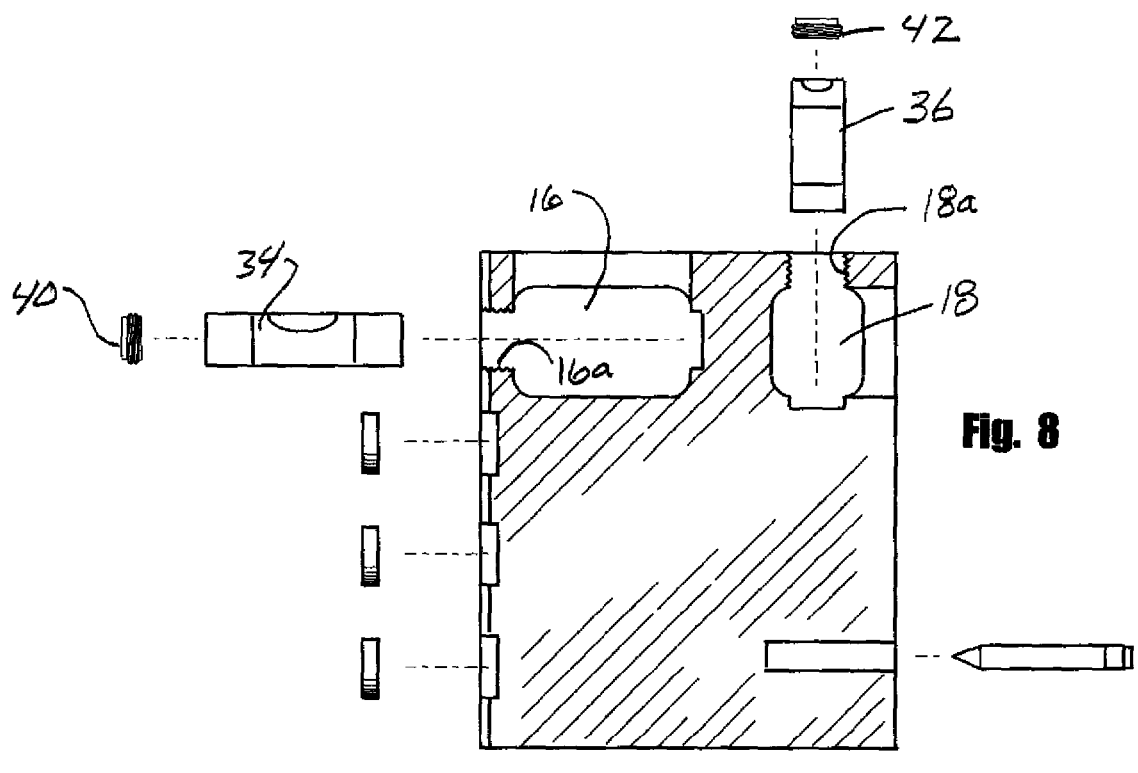
FIG. 8 is a cross-sectional, exploded view taken along lines 8-8 of FIG. 6.

Referring to the drawings and particularly to FIGS. 1 through 5, one form of the positioning device of the present invention for determining the orientation of a structure, such as a post, is there shown and generally designated by the numeral 12. Positioning device 12 here comprises a generally cubical shaped body 14 that includes an upper portion 14a having first and second vial chambers 16 and 18, a lower portion 14b, a rear surface 14c and first and second sides 14d and 14e respectively. For a purpose presently to be described, first vial chamber 16 has a threaded opening 16a and second vial chamber 18 has a threaded opening 18a (FIG. 8). Body 14 has a top surface 20 and a lower, outwardly extending portion 22 that includes a first side 22a that is provided with a slot 24 and a second side 22b that is provided with a slot 26. Disposed intermediate first and second sides 22a and 22b is a chamber 28. Outwardly extending lower portion 22 further includes a top surface 22c that is provided with a bulls-eye level 30. Importantly, rear surface 14c of body 14 is provided with an outwardly extending locating shoulder 32 for engaging the structure to be oriented, such as post "P", or alternatively a horizontal structural member "M" (see FIGS. 9 and 10).

Figure 1:
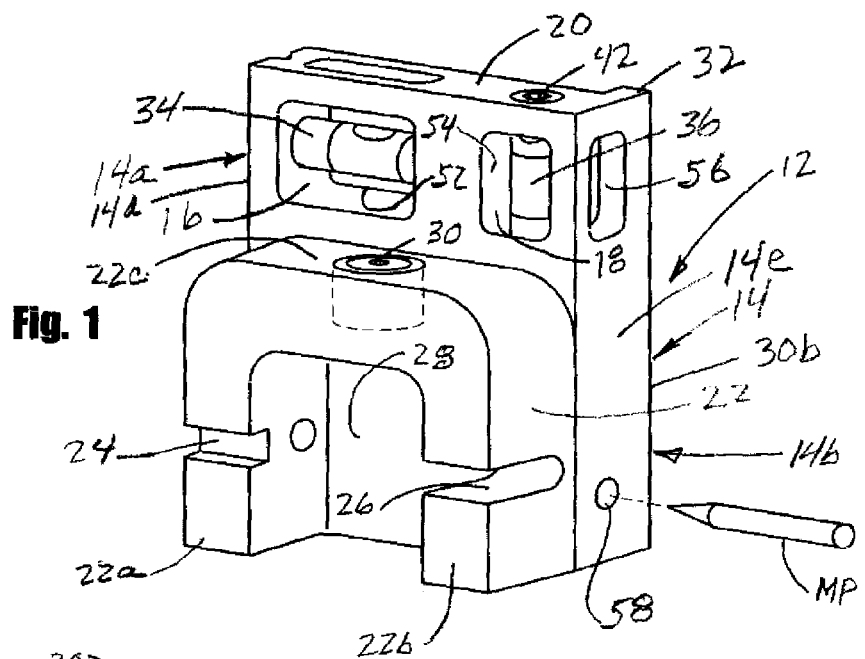
FIG. 1 is a generally perspective view of one form of the post positioning tool of the invention.
Figure 2:
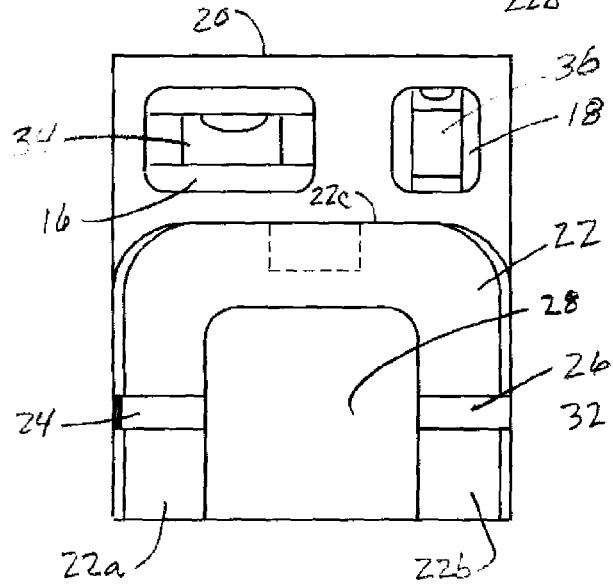
FIG. 2 is a front view of the tool shown in FIG. 1.
Figure 3:
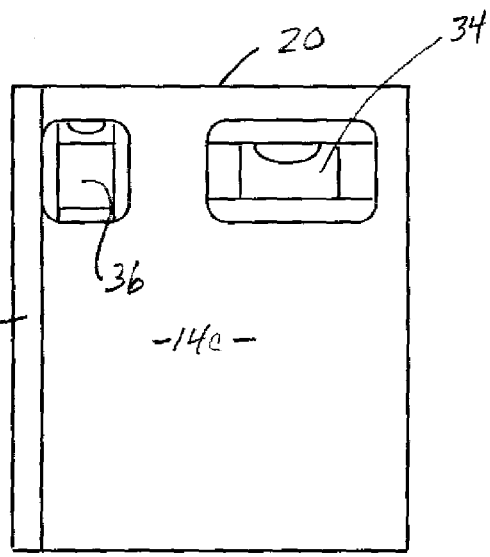
FIG. 3 is a rear view of the tool shown in FIG. 1.

Mounted within first vial chamber 16 of the upper portion 14a of body 14 is a first conventional bubble, or spirit vial 34 and mounted within second vial chamber 18 is a second conventional bubble, or spirit vial 36. As shown in FIG. 1 of the drawings, first bubble vial 34 is disposed in a generally parallel relationship with the top surface 20 of the upper portion 14a of the body, while second bubble vial 36 is disposed in a generally perpendicular relationship with the top surface of the upper portion of the body.

As best seen in FIG. 8 of the drawings, a first threaded connector, shown here in the form of a conventional cap screw 40, is receivable within threaded opening 16a of the first vial chamber 16 for movement between first and second positions to secure the first bubble vial 34 within first vial chamber 16. Similarly, a second threaded connector, shown here in the form of a conventional cap screw 42 is receivable within threaded opening 18a of second vial chamber 18 for movement between first and second positions to secure the second bubble vial 36 within the second vial chamber 18. With the construction thus described, either or both of the bubble vials of the tool can be conveniently removed and replaced by simply removing the threaded cap screw from the threaded end portion of the vial chamber and then by removing the bubble vial from its chamber. Unlike the prior art levels, if a given bubble vial is broken or otherwise damaged, it can be easily replaced and the tool need not be discarded.

Figure 9:
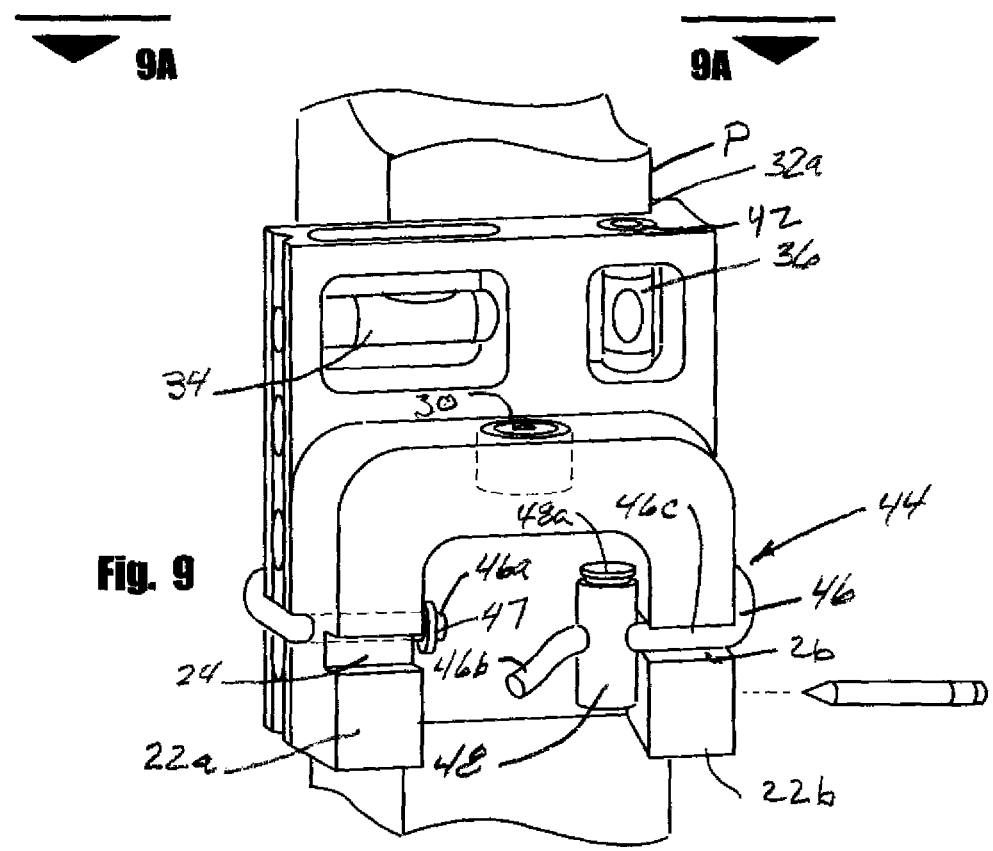
FIG. 9 is a diagrammatic, generally perspective view of the post positioning tool of the invention as it appears when affixed to a post being positioned.

Another highly important feature of the present invention resides in the provision of a connector mechanism 44 for releasably interconnecting body 14 with the structure to be oriented, such as post "P". Connector mechanism 44 here comprises an elongate elastomeric cord 46 and a cooperating securement member 48 which is carried by the intermediate portion of the elastomeric cord and, in a manner presently to be described, functions to secure the cord to the body 14 (FIG. 9). Elastomeric cord 46 includes a first end portion 46a that is connected to leg 22a of the lower portion 22 of body 14 by means of a securement disk 47. Cord 46 also includes a second free end 46b and an intermediate portion 46c that is receivable within slot 24 of first side 22a (see FIG. 9).

In using the positioning device of the invention to orient a post, such as post "P", the device is first positioned in engagement with the post in the manner shown in FIG. 9 of the drawings so that the inside surface 32a of the shoulder 32 is in engagement with one side of the post. With the device in this position, the elastomeric cord 46 is wrapped around the post and the intermediate portion thereof is inserted into slot 26 of leg 22b. Next, the cord is appropriately stretched and then, by pressing on the release button 48a, the securement member 48 is moved along the cord until it resides in engagement with the inner wall of leg 22b in the manner shown in FIG. 9 of the drawings to thereby secure the elastomeric cord within the slot 26. With the securement cord thusly positioned, the device is held in secure engagement with the post so that the workman can use both hands to orient the post.

As illustrated in the drawings, the upper portion 14a of body 14 is provided with a first viewing window 52 for viewing the first bubble vial 34 and second and third viewing windows 54 and 56 for viewing the second bubble vial 36. With this construction, the workman is accorded a clear view of the bubble vials so that the post can be readily oriented in a manner well understood by those skilled in the art. As shown in FIG. 1 of the drawings, the lower portion 14b of body 14 is provided with a cylindrical bore 58 that is adapted to receive and conveniently store a marking pencil "MP" that can be used by the workman to mark various indicia on the workpiece.

Figure 10:
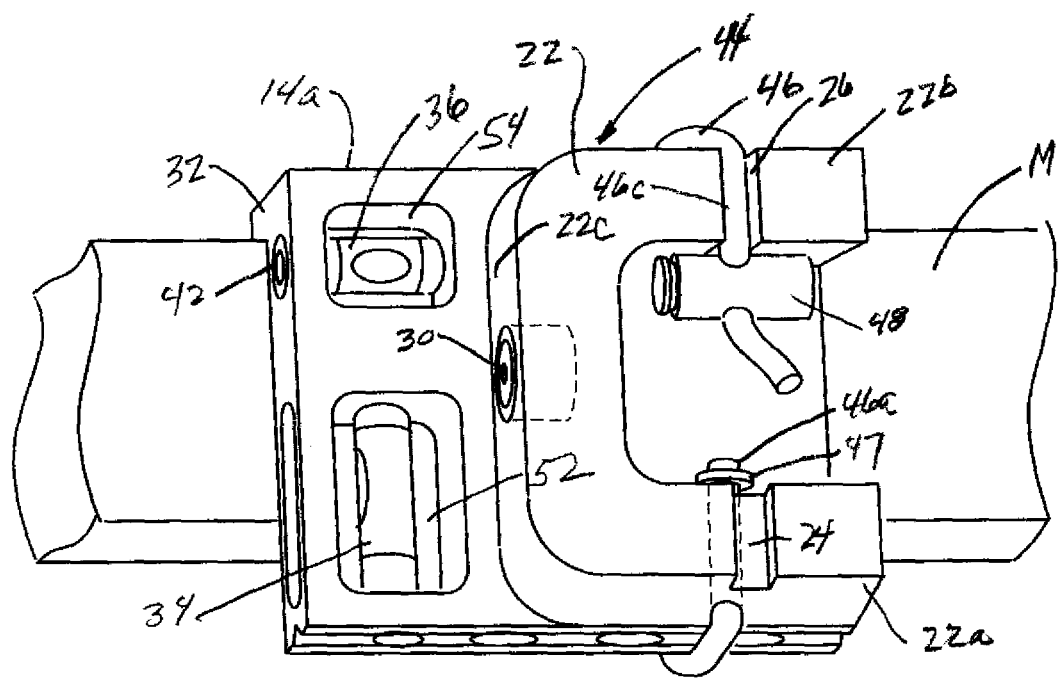
FIG. 10 is a diagrammatic, generally perspective view of the post positioning tool of the invention as it appears when affixed to a horizontally extending structural member that is being positioned.

As previously mentioned and as illustrated in FIG. 10 of the drawings, the apparatus of the invention can also be used to orient a horizontally disposed structural member, such as member "M". When so used, the device is first positioned in engagement with the member "M" in the manner shown in FIG. 10 of the drawings so that the inside surface 32a of the shoulder 32 is in engagement with one surface of the member. With the device in this position, the elastomeric cord 46 is wrapped around the member and, as in the earlier described use of the device, the intermediate portion of the cord is inserted into slot 26 of leg 22b. Next, the cord is appropriately stretched and then, by pressing on the release button 48a, the securement member 48 is moved along the cord until it resides in engagement with the inner wall of leg 22b in the manner shown in FIG. 10 of the drawings to thereby secure the elastomeric cord within the slot 26. With the securement cord thusly positioned, the device is held in secure engagement with the member "M" so that the workman can use both hands to appropriately orient the member. With the construction thus described, the workman is accorded a clear view of the second bubble vial 36 so that the member "M" can be readily oriented in a manner well understood by those skilled in the art.

Figure 9A:
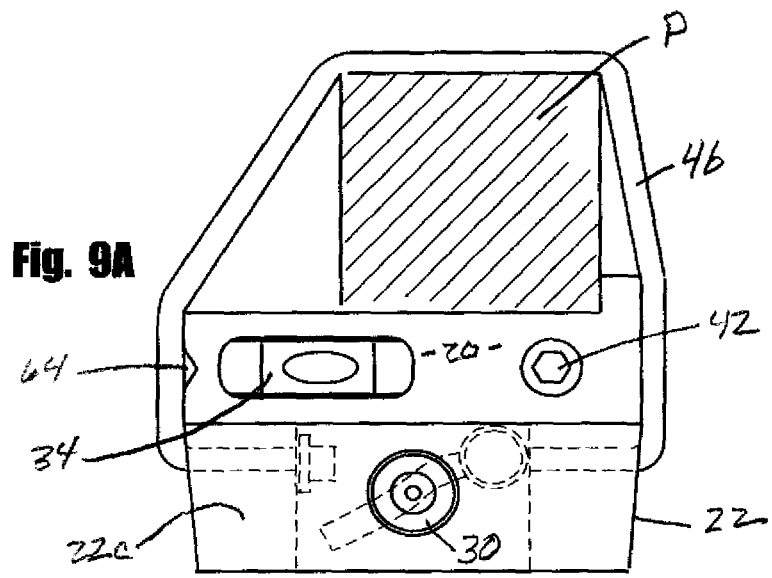
FIG. 9A is a view taken along lines 9A-9A of FIG. 9.
Figure 11:
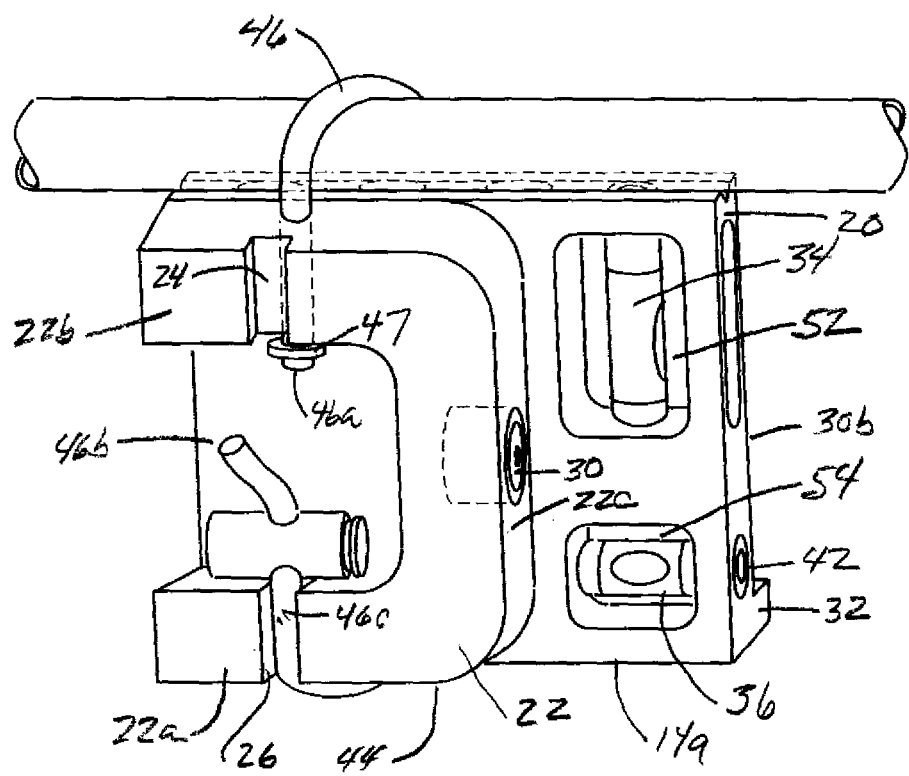
FIG. 11 is a diagrammatic, generally perspective view of the post positioning tool of the invention as it appears when affixed to a horizontally extending ferrous member that is being positioned.

Turning now to FIG. 11 of the drawings, the apparatus of the invention can also be used to orient a ferrous metal structural member, such as an elongated pipe "EP". When so used, side 14d of body 14 is first positioned in engagement with the pipe in the manner shown in FIG. 11. Because side 14d is uniquely provided with a plurality of spaced apart magnets 62 (see FIG. 4), the elongated pipe "EP" will be securely held in engagement with side 14d. Additionally, because side 14d is also provided with a generally V-shaped groove 64 along its length (see also FIGS. 6 and 9A), the pipe will be removably received within the groove and will be held longitudinally centered with side 14d. Because the magnets 62 will securely grip the pipe, the use of the elastomeric connector cord 46 to further secure the pipe in position in the manner shown in FIG. 11 is optional.

Figures 18, 19:
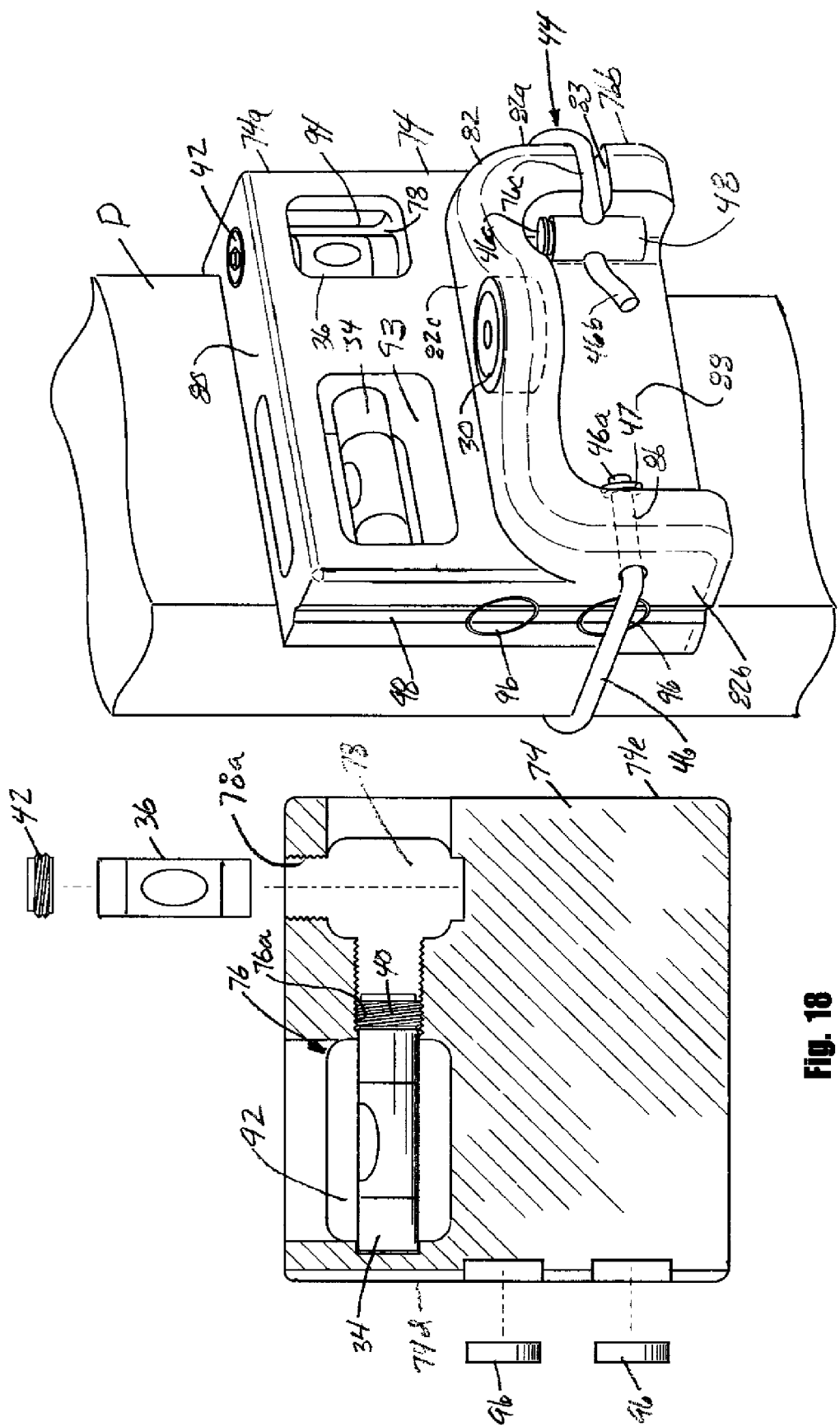
FIG. 18 is a cross-sectional, exploded view taken along lines 18-18 of FIG. 16.
FIG. 19 is a diagrammatic, generally perspective view of the alternate form of the post positioning tool of the invention as it appears when affixed to a post being positioned.

Referring now to FIGS. 12 through 19, an alternate form of the positioning device of the present invention for determining the orientation of a structure, such as a post, is there shown and generally designated by the numeral 71. Positioning device 72 is similar in construction and operation to the positioning device shown in FIGS. 1 through 11 and like numerals are used in FIGS. 12 through 19 to identify like components. Positioning device 72 here comprises a generally cubical shaped body 74 that includes an upper portion 74a having first and second vial chambers 76 and 78, a lower portion 74b, a rear surface 74c and first and second sides 74d and 74e respectively. For a purpose presently to be described, first vial chamber 76 has a threaded opening 76a and second vial chamber 78 has a threaded opening 78a (FIG. 18). Body 74 has a top surface 80 and a lower, outwardly extending portion 82 that includes a first side 82a that is provided with a slot 83 and a second side 82b that is provided with a bore 86. Disposed intermediate first and second sides 82a and 82b is a chamber 88. Outwardly extending lower portion 82 further includes a top surface 82c that is provided with a bulls-eye level 30. Importantly, rear surface 74c of body 74 is provided with an outwardly extending locating shoulder 92 for engaging the structure to be oriented, such as post "P", or alternatively a horizontal structural member (FIG. 19).

Figure 12:
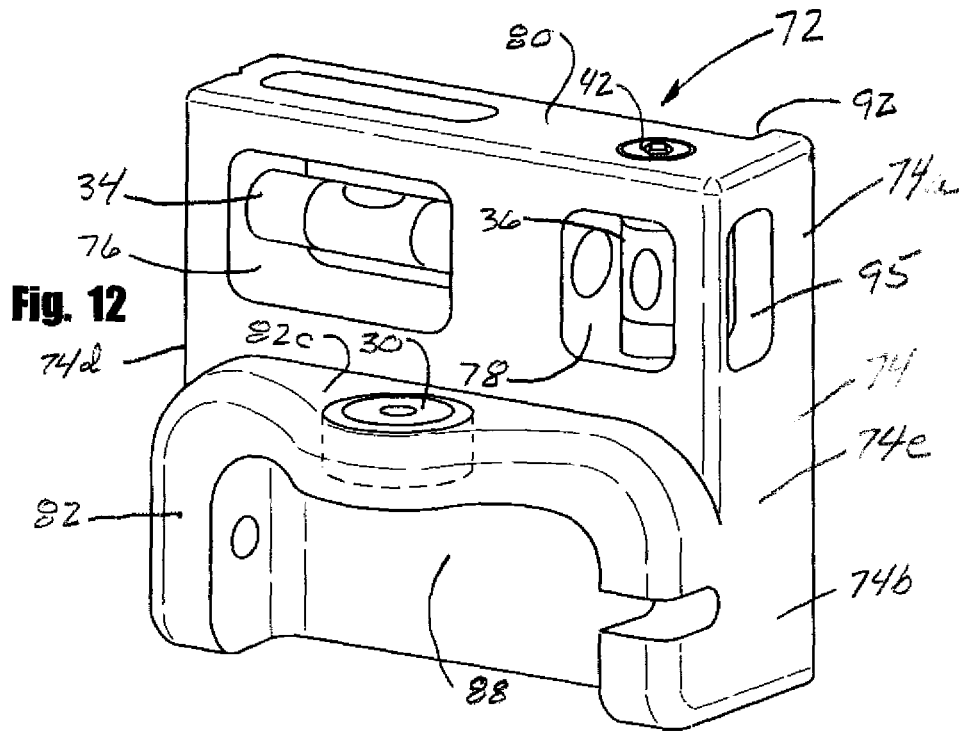
FIG. 12 is a generally perspective view of an alternate form of the post positioning tool of the invention.
Figure 13:
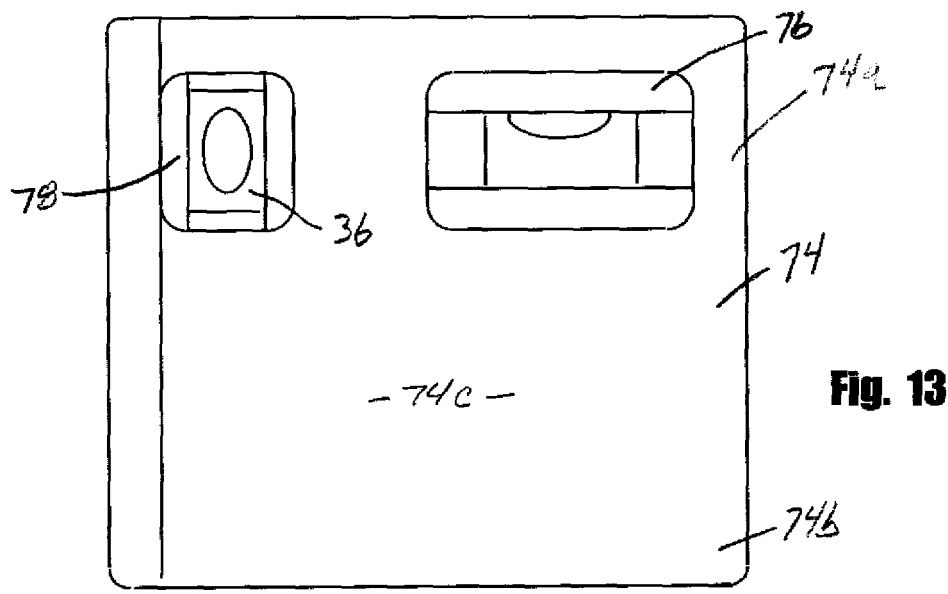
FIG. 13 is a rear view of the tool shown in FIG. 12.

Mounted within first vial chamber 76 of the upper portion 74a of body 74 is a first conventional bubble, or spirit vial 34, and mounted within second vial chamber 78 is a second conventional bubble, or spirit vial 36. As shown in FIG. 12 of the drawings, first bubble vial 34 is disposed in a generally parallel relationship with the top surface 80 of the upper portion 74a of the body, while second bubble vial 36 is disposed in a generally perpendicular relationship with the top surface of the upper portion of the body.

As best seen in FIG. 18 of the drawings, a first threaded connector, shown here in the form of a conventional cap screw 40, is receivable within threaded opening 76a of the first vial chamber 76 for movement between first and second positions to secure the first bubble vial 34 within first vial chamber 76. Similarly, a second threaded connector, shown here in the form of a conventional cap screw 42, is receivable within threaded opening 78a of second vial chamber 78 for movement between first and second positions to secure the second bubble vial 36 within the second vial chamber 78. With the construction thus described, either or both of the bubble vials of the tool can be conveniently removed and replaced by simply removing the threaded cap screw from the threaded end portion of the vial chamber and then by removing the bubble vial from its chamber. Unlike the prior art levels, if a given bubble vial is broken or otherwise damaged, it can be easily replaced and the tool need not be discarded.

Another highly important feature of the present invention resides in the provision of a connector mechanism 44 for releasably interconnecting body 74 with the structure to be oriented, such as post "P" (see FIG. 19). As in the earlier described embodiment of the invention, connector mechanism 44 here comprises an elongate elastomeric cord 46 and a cooperating securement member 48 which is carried by the intermediate portion of the elastomeric cord and, in the manner previously described, functions to secure the cord to the body 74 (FIG. 19). Elastomeric cord 46 includes a first end portion 46a that is connected to leg 82b of portion 82 of body 74 by means of a securement disk 47. Cord 46 also includes a second free end portion 46b and an intermediate portion 46c that is receivable within slot 83 of side 82a (see FIG. 19).

In using the positioning device of the invention to orient a post, such as post "P", the device is first positioned in engagement with post in the manner shown in FIG. 19 of the drawings so that the inside surface of the shoulder 92 is in engagement with one side of the post. With the device in this position, the elastomeric cord 46 is wrapped around the post and the intermediate portion thereof is inserted into slot 83 of leg 82a. Next, the cord is appropriately stretched and then, by pressing on the release button 48a, the securement member 48 is moved along the cord until it resides in engagement with the inner wall of leg 82a in the manner shown in FIG. 19 of the drawings to thereby secure the elastomeric cord within the slot 26. With the securement cord thusly positioned, the device is held in secure engagement with the post so that the workman can use both hands to orient the post.

As illustrated in the drawings, the upper portion 74a of body 74 is provided with a first viewing window 93 for viewing the first bubble vial 34 and second and third viewing windows 94 and 95 (FIG. 12) for viewing the second bubble vial 36. With this construction, the workman is accorded a clear view of the bubble vials so that the post can be readily oriented in a manner well understood by those skilled in the art.

The apparatus of this latest form of the invention can also be used in the manner previously described in connection with the first embodiment of the invention to orient a horizontally disposed structural member, such as structural member "M".

Turning now to FIG. 18 of the drawings, the apparatus of this latest form of the invention can also be used to orient a ferrous metal structural member, such as an elongated pipe. When so used, side 74d of body 74 is first positioned in engagement with the pipe. Because side 74d is uniquely provided with a plurality of spaced apart magnets 96, the elongated pipe will be securely held in engagement with side 74d. Additionally, because side 74d is also provided with a generally V-shaped groove 98 along its length (see also FIGS. 6 and 9A), the pipe will be removably received within the groove and will be held longitudinally centered with side 14d. Because the magnets 62 will securely grip the pipe, the use of the elastomeric connector cord 46 to further secure the pipe in position in the manner shown in FIG. 11 is optional.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:
1. A level for determining the orientation of a structure comprising:
(a) a body including an upper portion having a first vial chamber, a second vial chamber and a top surface, a lower portion having a first side having a slot and a second side, said body having a rear surface provided with an outwardly extending locating shoulder for engaging the structure to be oriented;
(b) a first bubble vial disposed within said first vial chamber of said upper portion of said body;
(c) a second bubble vial disposed within said second vial chamber of said upper portion of said body; and
(d) a connector member for connecting said body to the structure to be oriented.

2. The level as defined in claim 1 in which each said first and second vial chambers of said upper portion of said body has a threaded opening and in which said level further includes a threaded connector receivable within said threaded opening of each of said first and second vial chambers for movement between first and second positions to secure said bubble vials within said vial chambers.

3. The level as defined in claim 1 in which said lower portion of said body includes a surface provided with a bulls-eye level.

4. The level as defined in claim 1 in which said connector member comprises:
(a) an elastomeric cord having a first end connected to said body, a second free end and an intermediate portion receivable within said slot of said first side of said body; and
(b) a securement member connected to said intermediate portion of said elastomeric cord for securing said intermediate portion within said slot.

5. The level as defined in claim 1 in which said top surface of said upper portion of said body includes a first viewing window for viewing said first bubble vial and a second viewing window for viewing said second bubble vial.

6. The level as defined in claim 1 in which said body includes a sidewall having a side viewing window for viewing said second bubble vial.

7. The level as defined in claim 1 in which said body includes a bore for telescopically receiving a marking pencil.

8. The level as defined in claim 1 in which said second side of said lower portion of said body includes a slot.

9. The level as defined in claim 1 in which said lower portion of said body includes a centrally disposed chamber.

10. The level as defined in claim 1 further including a plurality of magnets connected to said body for engaging a structure to be oriented.

11. A level for determining the orientation of a structure comprising:
(a) a body including an upper portion having a first vial chamber having a threaded opening, a second vial chamber having a threaded opening and a top surface, a lower portion having a first side having a slot, a second side and a chamber disposed intermediate said first and second sides, said body further including an intermediate portion having an intermediate surface and a rear surface having an outwardly extending locating shoulder for engaging the structure to be oriented;
(b) a first bubble vial disposed within said first vial chamber of said upper portion of said body;
(c) a first threaded connector receivable within said threaded opening of said first vial chamber for movement between first and second positions to secure said first bubble vial within said first vial chamber;
(d) a second bubble vial disposed within said second vial chamber of said upper portion of said body;
(e) a second threaded connector receivable within said threaded opening of said second vial chamber for movement between first and second positions to secure said second bubble vial within said first vial chamber; and
(f) an elongated elastomeric cord connected to said body for connecting said body to the structure to be oriented.

12. The level as defined in claim 11 further including a bulls-eye level connected to said intermediate surface of said intermediate portion of said body.

13. The level as defined in claim 11 in which said elongated elastomeric cord includes an intermediate portion receivable within said slot of said first side of said body and in which said level further includes a securement member connected to said elastomeric cord and removably receivable within said chamber of said lower portion of said body for securing said intermediate portion of said elastomeric cord within said slot.

14. The level as defined in claim 11 in which said top surface of said upper portion of said body includes a first viewing window for viewing said first bubble vial and a second viewing window for viewing said second bubble vial.

15. The level as defined in claim 11 in which said body includes a sidewall having a side viewing window for viewing said second bubble vial.

16. The level as defined in claim 11 in which one of said first and second bubble vials is disposed in a generally parallel relationship with said top surface of said upper portion of said body and in which one of said first and second bubble vials is disposed in a generally perpendicular relationship with said top surface of said upper portion of said body.

17. The level as defined in claim 11 further including a plurality of magnets connected to said body for engaging a structure to be oriented.

18. A level for determining the orientation of a structure comprising:
(a) a body including an upper portion having a first vial chamber having a threaded opening, a second vial chamber having a threaded opening and a top surface, a lower portion having a first side having a slot, a second side and a chamber disposed intermediate said first and second sides, said body further including an intermediate portion having an intermediate surface and a rear surface having an outwardly extending locating shoulder for engaging the structure to be oriented;
(b) a first bubble vial disposed within said first vial chamber of said upper portion of said body;
(c) a first threaded connector receivable within said threaded opening of said first vial chamber for movement between first and second positions to secure said first bubble vial within said first vial chamber;
(d) a second bubble vial disposed within said second vial chamber of said upper portion of said body;
(e) a second threaded connector receivable within said threaded opening of said second vial chamber for movement between first and second positions to secure said second bubble vial within said first vial chamber;
(f) a bulls-eye level connected to said intermediate surface of said intermediate portion of said body;
(g) an elongated elastomeric cord connected to said body for connecting said body to the structure to be oriented; and
(h) a securement member connected to said elastomeric cord, said securement member being removably receivable within said chamber of said lower portion of said body for securing said elastomeric cord within said slot.

19. The level as defined in claim 18 in which said top surface of said upper portion of said body includes a first viewing window for viewing said first bubble vial and a second viewing window for viewing said second bubble vial.

20. The level as defined in claim 18 further including a plurality of magnets connected to said body for engaging a structure to be oriented.

\* \* \* \* \*